(12) United States Patent
Prakash

(10) Patent No.: US 7,957,032 B2
(45) Date of Patent: *Jun. 7, 2011

(54) DEFECT AND MAINTENANCE DETECTION FOR IMAGE CAPTURE DEVICE

(75) Inventor: Ravi Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 359 days.

This patent is subject to a terminal disclaimer.

(21) Appl. No.: 12/138,347

(22) Filed: Jun. 12, 2008

(65) Prior Publication Data
US 2008/0246862 A1    Oct. 9, 2008

Related U.S. Application Data

(63) Continuation of application No. 11/101,072, filed on Apr. 7, 2005, now Pat. No. 7,480,080.

(51) Int. Cl.
*H04N 1/40* (2006.01)

(52) U.S. Cl. .................. 358/3.26; 358/406; 358/463

(58) Field of Classification Search .................. 358/1.9, 358/2.1, 3.24–3.27, 463, 406, 504
See application file for complete search history.

(56) References Cited

U.S. PATENT DOCUMENTS

| | | |
|---|---|---|
| 5,047,861 A | 9/1991 | Houchin et al. |
| 5,149,977 A | 9/1992 | Mita |
| 5,692,065 A | 11/1997 | Prakash et al. |
| 6,512,217 B1 | 1/2003 | Kameshima |
| 6,801,670 B2 | 10/2004 | Kijima et al. |
| 7,031,026 B2 | 4/2006 | Prakash |

FOREIGN PATENT DOCUMENTS

JP    11027585 A    1/1999

OTHER PUBLICATIONS

Prakash, U.S Appl. No. 09/862,050, Office Action Communication, Jan. 11, 2005, 7 pages.
Prakash, U.S Appl. No. 09/862,050, Notice of Allowance & Fees Due, Aug. 31, 2005, 7 pages.
Prakash, U.S Appl. No. 11/101,072, Office Action Communication, Sep. 28, 2007, 7 pages.
Prakash, U.S Appl. No. 11/101,072, Office Action Communication, Mar. 31, 2008, 8 pages.
Prakash, U.S Appl. No. 11/101,072, Notice of Allowance & Fees Due, Sep. 11, 2008, 7 pages.

*Primary Examiner* — Thomas D Lee
*Assistant Examiner* — Stephen M Brinich
(74) *Attorney, Agent, or Firm* — Douglas Lashmit; Hoffman Warnick LLC

(57) ABSTRACT

Defect and maintenance detection for an image capture device (ICD) capable of distinguishing between a defect in the ICD and one on the imaged object. The defect detection system includes, inter alia: a value combiner that combines a brightest image video value for each sensing element of the ICD experiencing the imaged object with a corresponding stored device video value to create a combined value for each image video value; and a defect determinator determines the presence of a defect(s) by comparing the combined values to a defect threshold. The maintenance detection system includes a determinator that determines when maintenance is required based on whether a single image is considered defective or whether a number of consecutive defective images have been created. Device video values are updated sluggishly according to corresponding image video values.

6 Claims, 3 Drawing Sheets

DEFECT AND MAINTENANCE DETECTION FOR IMAGE CAPTURE DEVICE

This application is a continuation of U.S. patent application Ser. No. 11/101,072, filed Apr. 7, 2005 now U.S. Pat. No. 7,480,080.

BACKGROUND OF THE INVENTION

1. Technical Field

The present invention relates generally to a method and apparatus for detecting when a defect is present in an image capture device such as a scanner and when maintenance is required. More particularly, the present invention relates to a method and apparatus for detecting a defect in an image capture device that can distinguish between a defect in the image capture device and one on the imaged object; and a method, apparatus and computer program product for detecting when maintenance is required.

2. Related Art

Digital imaging of documents, photographs and other objects provides numerous advantages including the ability to easily process, analyze and communicate images. One common method of creating a digital image is scanning using an image capture device such as a scanner. An image capture device typically includes a bar, or line, of illumination and a plurality of sensing elements such as a charge-coupled device (CCD). The sensing elements create the digitized image of the object. There are a variety of different type image capture devices such as a desktop flat bed scanner, a desktop document feed scanner or a higher speed, industrial variation of either scanner. An object to be imaged is typically either moved over the sensing elements (feed-type) or the sensing elements are moved over the object (flat-bed type).

During scanning, defects such as build up of ink, smudges, dust, moisture, etc., on component(s) of the image capture device can cause streaky or defective images. Such defects may occur, for example, in the illumination path between the sensing elements and the object being imaged (e.g., between CCDs and the glass platen) and/or the imaging path through which the sensing elements or object passes (e.g., on the glass platen) and/or on the sensing elements themselves.

In related art devices, imaging non-uniformities are compensated for using the image capture device's calibration process. Typically, image capture device calibration steps alter the video gain and offset so that a uniform emmissivity imaged object produces uniform video. Following calibration, any localized defects caused by the image capture device can result in a locally reduced video value leading to streaky images. Hence, detection of the presence of defects in an image capture device is necessary.

One challenge for detecting when maintenance is required to correct an defect is to be able to distinguish between a streak resulting from hardware, namely the image capture device components, and defects resulting from the object being scanned. Related art devices inadequately address this challenge and, as a result, may give false indications of when maintenance is required to correct a defect in the image capture device.

Another challenge for detecting when maintenance is required is not making premature false indications for problems that may self-correct. For instance, a piece of dust may cause a defect, but the piece of dust may be removed through normal operation of the image capture device, e.g., removal by a subsequent imaged object, aerodynamic activity in an industrial scanner, etc. In certain circumstances, a limited number of defective images created by the piece of dust may be acceptable. In this case, an indication that maintenance is required before the imaging of the acceptable number of objects is unnecessary. Related art devices inadequately address this self-correcting defect challenge and may give premature false indications.

In view of the foregoing, there is a need in the art for defect and maintenance detection in an image capture device that can distinguish between a defect in the image capture device and one on the imaged object.

SUMMARY OF THE INVENTION

A first aspect of the invention is directed to a maintenance detection system for use with an image capture device having a plurality of sensing elements for creating an image of an object, the system comprising: a device video profiler that accesses a stored device video value for each sensing element; an image video profiler that acquires an image video value for each sensing element that experiences the object, each image video value representing a brightest video value experienced by the respective sensing element during imaging of the object; a value combiner that combines each image video value with a corresponding device video value to create a combined value for each image video value; a defect determinator that determines the presence of a defect in the image capture device based on a combined value exceeding a defect threshold; and a maintenance determinator that determines when maintenance is required based on the defect determinator outcome.

A second aspect of the invention is directed to an imaging system comprising: an image capture device for imaging an object; an image capture processor; and a maintenance detection system as discussed above.

A third aspect of the invention provides a defect detection system for use with an image capture device having a plurality of sensing elements for imaging an object, the system comprising: a device video profiler that accesses a stored device video value for each sensing element; an image video profiler that acquires an image video value for each sensing element that experiences the object, each image video value representing a brightest video value experienced by the respective sensing element during imaging of the object; a value combiner that combines each image video value with a corresponding device video value to create a combined value for each image video value; and a defect determinator that determines when a defect is present on the image capture device based on a combined value exceeding a defect threshold.

A fourth aspect of the invention is directed to a method for detecting when maintenance is required in an image capture device having a plurality of sensing elements for imaging an object, the method comprising the steps of: a) accessing a device video value for each sensing element; b) imaging an object with the image capture device; c) acquiring an image video value for each sensing element that experiences the object, each image video value representing a brightest video value experienced by the respective sensing element during imaging of the object; d) combining each image video value with a corresponding device video value to create a combined value for each image video value; e) determining a defect is present in the image capture device for each combined value that exceeds a defect threshold; f) determining when maintenance is required based on the presence of at least one defect; and g) indicating when maintenance is required for the image capture device.

A fifth aspect of the invention provides a system for determining when maintenance is required in an image capture device, the system comprising: means for accessing a plurality of device video values for the image capture device; means for acquiring a plurality of image video values as an object is imaged by the image capture device; means for combining each image video value with a corresponding device video value to create a combined value; means for detecting a defect by comparing each combined value to a defect threshold to determine the presence of a defect; and means for determining when maintenance is required based on the outcome of the means for detecting a defect.

A sixth aspect of the invention provides a defect detection system for use with an image capture device having a plurality of sensing elements for imaging an object, the system comprising: means for accessing a plurality of device video values for the image capture device; means for acquiring a plurality of image video values as an object is imaged by the image capture device; means for combining each image video value with a corresponding device video value to create a combined value; and means for comparing each combined value to a defect threshold to determine the presence of a defect.

A final aspect of the invention provides a computer program product comprising a computer useable medium having computer readable program code embodied therein for determining when maintenance is required in an image capture device having a plurality of sensing elements for imaging a plurality of objects, the computer program product comprising: program code configured to access a device video value for each sensing element; program code configured to acquire an image video value for each sensing element that experiences an object as the object is imaged, wherein each image video value represents a brightest video value experienced by the respective sensing element during imaging of the object; program code configured to compare each combined value of the image to a defect threshold to determine the presence of a defect; program code configured to determine whether the image is defective as defined by a defect count of defects in the image exceeding a defect count threshold; and program code configured to determine maintenance is required when a consecutive defective image count exceeds an image count threshold.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Figure 1:
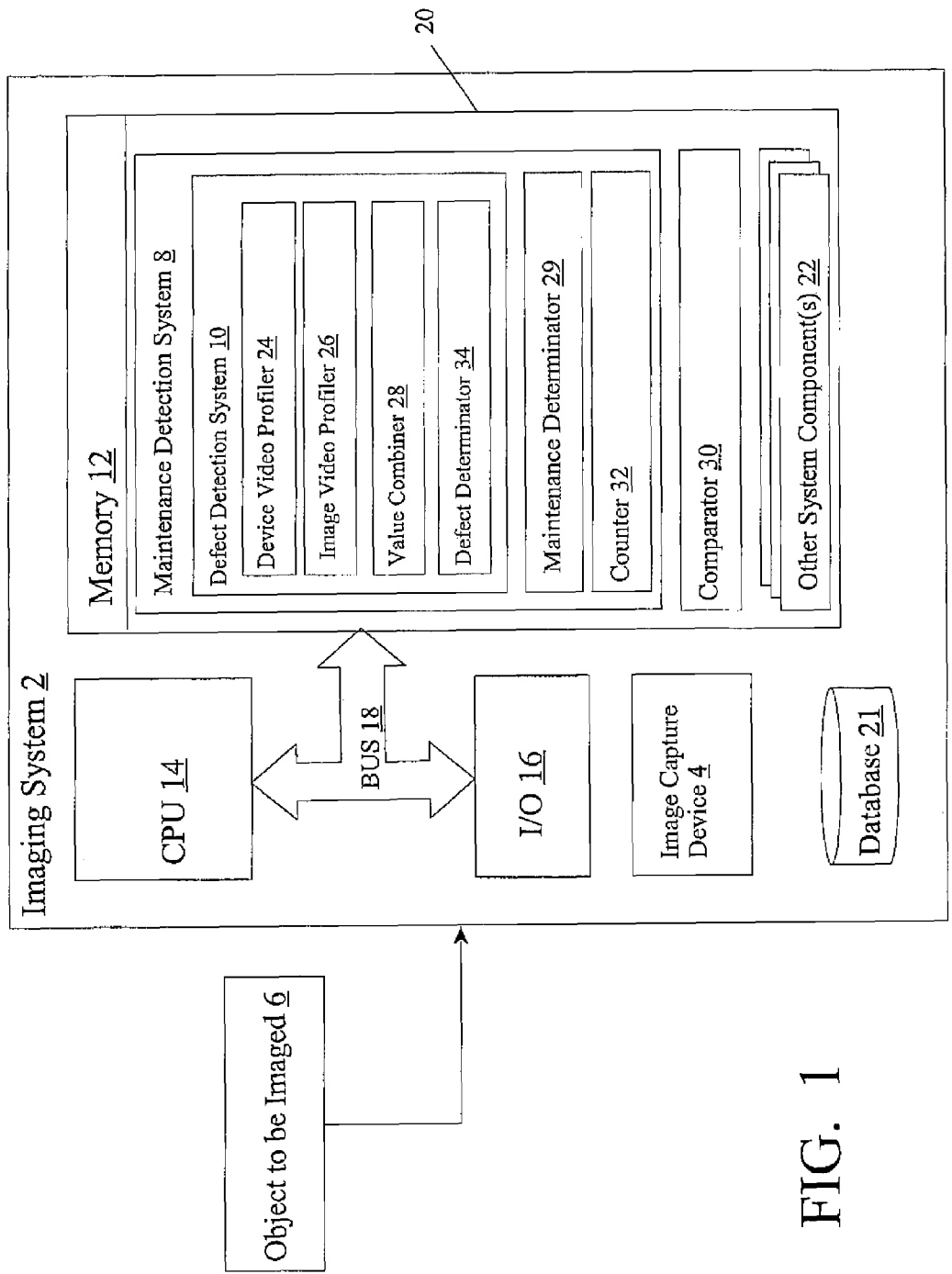
FIG. 1 shows a block diagram of an imaging system including defect and maintenance detection systems in accordance with the invention.

FIG. 1 is a block diagram of an imaging system 2 including an image capture device 4 for imaging an object 6 and a maintenance detection system 8 including a defect detection system 9 in accordance with the present invention. Image capture device 4 may also be a separate component from imaging system 2.

System 2 preferably includes a memory 12, a central processing unit (CPU) 14, input/output devices (I/O) 16 and a bus 18. A database 21 may also be provided for storage of data relative to processing tasks. Memory 12 preferably includes a program product 20 that, when executed by CPU 14, comprises various functional capabilities described in further detail below. Memory 12 (and database 21) may comprise any known type of data storage system and/or transmission media, including magnetic media, optical media, random access memory (RAM), read only memory (ROM), a data object, etc. Moreover, memory 12 (and database 21) may reside at a single physical location comprising one or more types of data storage, or be distributed across a plurality of physical systems. CPU 14 may likewise comprise a single processing unit, or a plurality of processing units distributed across one or more locations. I/O 16 may comprise any known type of input/output device including a network system, modem, keyboard, mouse, scanner, voice recognition system, CRT, printer, disc drives, etc. Additional components, such as cache memory, communication systems, system software, etc., may also be incorporated into system 2.

Imaging system 2 may be implemented in a variety of forms. For example, imaging system 2 may be implemented as part of an IBM 3897 Model 4 Image Capture System. Alternatively, imaging system 2 may be part of a high speed, high volume document processing system such as found in institutional banks. In this case, system 2, as recognized in the field, may include one or more networked computers, i.e., servers. A server computer typically comprises an advanced mid-range multiprocessor-based server, such as the RS6000 from IBM, utilizing standard operating system software, which is designed to drive the operation of the particular hardware and which is compatible with other system components, and I/O controllers.

Alternatively, system 2 may be implemented as part of a workstation such as a bank teller workstation. A workstation of this form may comprise, for example, an INTEL PENTIUM III microprocessor, or like processor, such as found in an IBM APTIVA computer.

Memory 12 of system 2 preferably includes a program product 20 that, when executed by CPU 14, provides various functional capabilities for system 2. As shown in FIG. 1, program product 20 may include maintenance detection system 8, a comparator 30 and other system component(s) 22. Other system component(s) 22 may include any well known image processing system components, e.g., an image capture processor. Maintenance detection system 8 includes defect detection system 10, a maintenance determinator 29 and a counter 32. Defect detection system 10 includes a device video profiler 24, an image video profiler 26, a value combiner 28, and a defect determinator 34. While a single comparator 30 has been disclosed, which is accessed by maintenance detection system 8 and/or defect detection system 10, as necessary, each system 8, 10 may include their own comparator.

In the following discussion, it will be understood that the method steps discussed preferably are performed by a processor, such as CPU 14 of system 2, executing instructions of program product 20 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

For purposes of explanation, object 6 may be described as a document, e.g., a check or a letter. It should be recognized, however, that the teachings of the present invention may be applied to any image capture device regardless of the object being imaged. Other object examples include, but are not limited to, photographs and lithographs.

Returning to FIG. 1, an object to be imaged 6 is fed through or placed within an image capture device 4. Image capture device 4 may be any type of now known or later developed scanner. For instance, image capture device 4 may be a desktop flat bed scanner, a desktop document feed scanner or a higher speed, industrial variation of either scanner. As known in the art, image capture device 4 (hereinafter "ICD 4") includes a bar, or line, of illumination and a plurality of sensing elements (not shown) such as charge-coupled devices (CCD). An object 6 to be imaged is either moved over sensing elements (feed-type) or sensing elements are moved over the object (flat-bed type). As an object is imaged, each sensing element of ICD 4 adjacent object 6 obtains a video value (representative of pel location). Furthermore, each sensing element of ICD 4 that experiences (i.e., sees) the object 6 will in most cases, at some point during the object's imaging, see a brighter region of the object. In terms of documents, this region is commonly white.

Figure 2A:
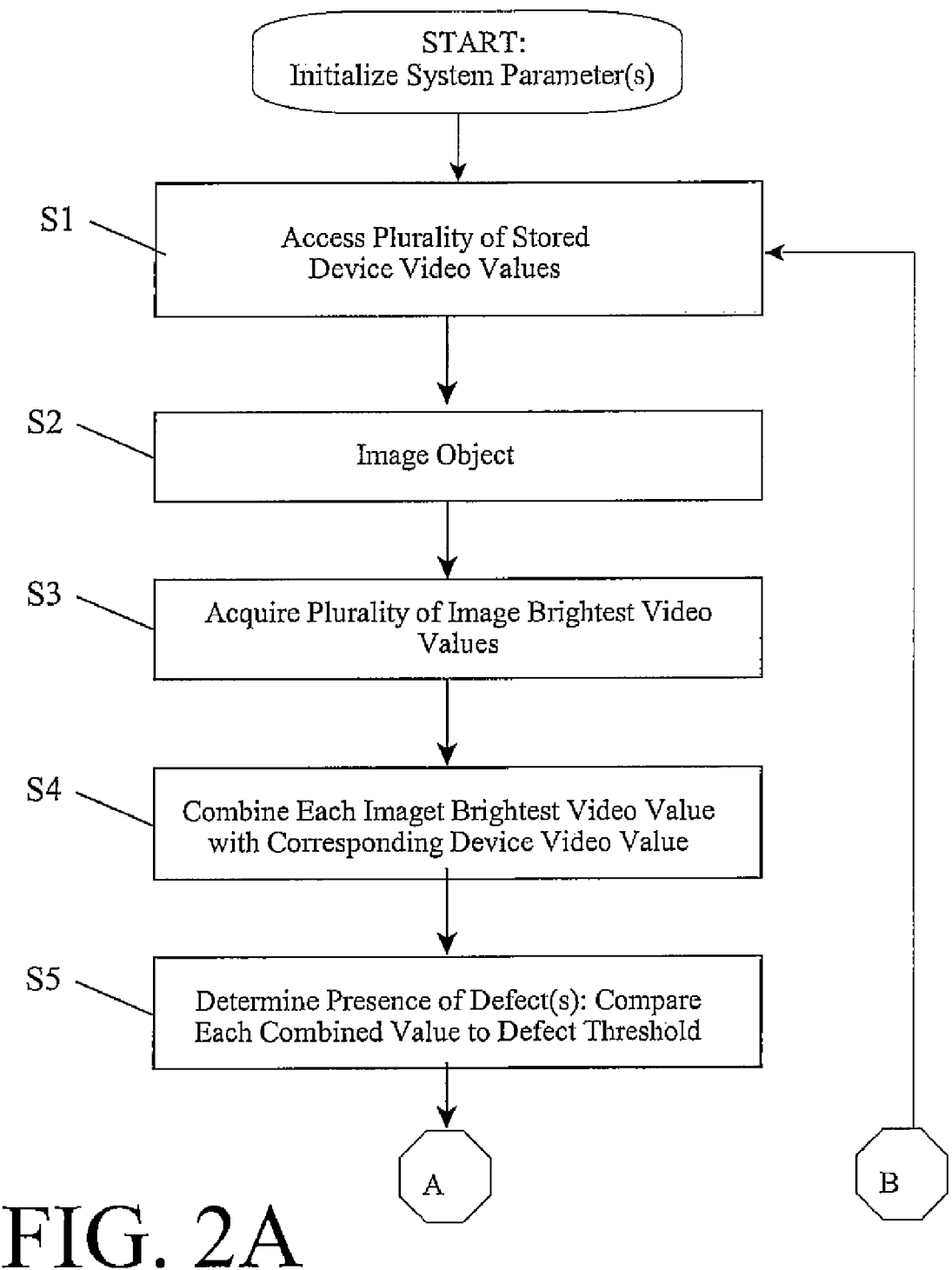
FIGS. 2A-B show a flow diagram of a method in accordance with the invention.
Figure 2B:
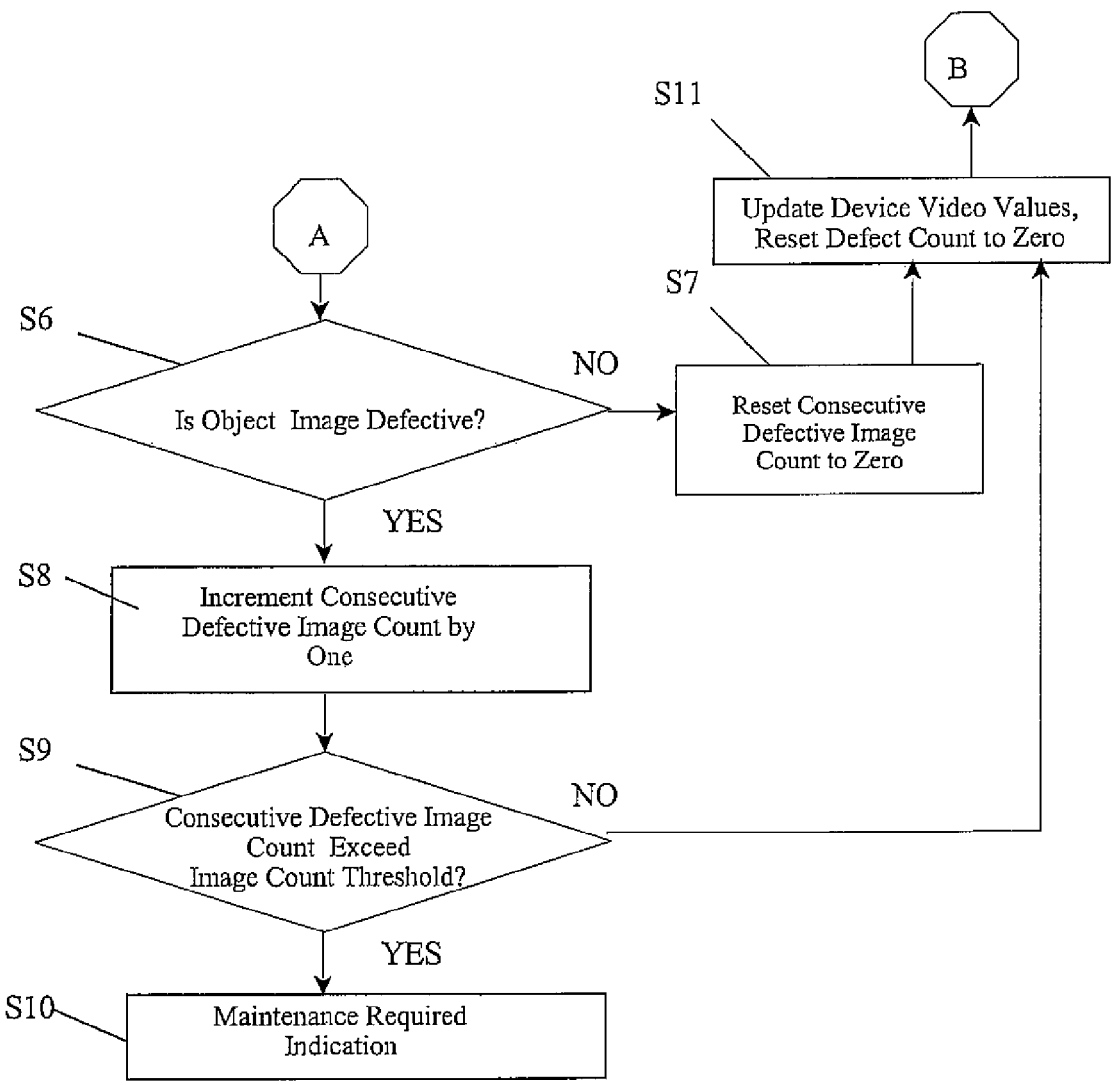

Referring to FIGS. 2A-B, operation of maintenance detection system 8 and defect detection system 10 will be explained. Steps S1-S5 and S11 represent operation of defect detection system 10, and steps S1-S11 represent operation of maintenance detection system 8.

Defect Detection:

At the START of the system logic, system 8 parameter(s) may be initialized. For instance, a consecutive defective image count, which will be described in greater detail below, is initialized by setting it to zero. In addition, if used, a defect count may be initialized by setting it to zero.

In a first step S1, a device video value is accessed by device video profiler 24 (FIG. 1) for each sensing element of ICD 4. Each device video value is representative of a brightest video value sensed by a corresponding sensing element of ICD 4 over a period of time. Device video values are stored, for example, in database 21. If an ICD 4 has, for example, 1024 sensing elements, 1024 device video values are provided. Actual device video values will vary according to the type of video system being used. For instance, for an 8 bit video system, video values range from 0 (darkest) to 255 (brightest). Other ranges of video values may be implemented for other video systems, e.g., a 10, 12 or 14 bit system.

Since each device video value is representative of a brightest video value sensed over a period of time, as defects in ICD 4 arise, such as build up of ink, smudges, dust, moisture, imperfections, etc., device video values will become darker. For purposes of this disclosure, while defects will be described as "in" ICD 4, it should be recognized that the term covers all matters of defects in, on or between any working part of ICD 4. Each device video value, as will be described below, is updated after each object 6 is imaged. Hence, each device video value may change over time, i.e., be indicative of brighter or darker situations. For a hypothetical 8 bit video ICD 4 that is completely clean of any defects, each device video value will be 255 or thereabouts. In reality, device video values will not be uniform, and may exhibit high frequency variations. For instance, a small sample for an 8-bit system may include values: 238, 240, 242, 215, 227.

Next, at step S2, an object 6 is imaged with ICD 4 in a known fashion.

At step S3, an image video value for each sensing element (i.e., pel location) that experiences the object is acquired by image video profiler 26 (FIG. 1). Each image video value represents a brightest video value experienced/sensed by a respective sensing element of ICD 4 that experiences/senses object 6 as it is imaged. Hence, each image video value represents a brightest video value based on object 6 and ICD 4. For example, for a document that covers 800 sensing elements, there will be 800 image video values. If a sensing element first senses a brightness of 220 and afterwards a brightness of 225, the image video value will be the 225 value.

Next, at step S4, value combiner 28 (FIG. 1) combines each image video value with a corresponding device video value to create a combined value for each image video value. Since an object 6 may not be large enough to include every sensing element of ICD 4, only those image video values acquired will be combined with a corresponding device video value. That is, system 8 only calculates a combined value for a region of sensing elements of ICD 4 that experience object 6.

In terms of the actual combination of values, value combiner 28 may operate in a number ways. In one embodiment, the actual image video value and the actual corresponding device video value may be multiplied to arrive at a corresponding combined value. In another embodiment, the image video value and corresponding device video value may, prior to combining, each be subtracted from a brightest available video value (e.g., 255 in an 8 bit system) to create a darkness value for each. For instance, for a device video value of 230, a device darkness value would be 25 (255−230). Each darkness value may then be combined, e.g., multiplied, to create the combined value. For purposes of this disclosure, however, the terms "image video value" and "device video value" should be considered to include either the actual video values that are directly indicative of brightness or their equivalent darkness values. Other mathematical operations that meaningfully combine the two video values may also be implemented. For instance, the video values may be added together or weighted in some fashion.

If a defect is building in an area of ICD 4 (e.g., because of dust accumulation), those sensing elements corresponding to that area have darker device video values. If device video values were put into a graph, the values would indicate a valley, e.g. ". . . . 238, 234, 230, 215, 225, 234, 237 . . . " A darker device video value alone is not accurately indicative of a defect in ICD 4 since an object 6 having darker regions may cause a darker device video value. When a darker device video value and a darker image video value are in-phase (i.e., in the same pel location), however, it is a good indication that a defect is present in ICD 4 at the video value (pel) location. The combined value indicates when these values are in-phase by combining corresponding device and image video values. An abnormality in the combined value (i.e., peak or depression depending on type of combined value used), especially one that repeats over the imaging of a number of objects 6, is a strong indication that a defect exists on ICD 4 at the video value (pel) location. Hence, the combined value amplifies the location of a defect in ICD 4 (and distinguishes the dark situation from one created by the object alone) by indicating where a device video value and an image video value are in-phase.

In step S5, defect determinator 34 determines the presence of one or more defects in the ICD 4 based on one or more combined values exceeding a defect threshold. More particularly, defect determinator 34 determines the presence of a defect(s) in ICD 4 by comparing each combined value to a defect threshold using comparator 30. As used herein the term "exceed" or "exceeding" should be interpreted to include a subject count or value going beyond (in a positive or negative sense depending on circumstances) or meeting a respective threshold. The "defect threshold" is a number that when compared to a combined value indicates an unacceptable dark situation, i.e., a defect, at the particular video value location. Hence, the defect threshold defines when a dark situation is a defect. The defect threshold may be user defined. A defect threshold may be, for example, 52,900 (device video value 230 times image video value 230) where actual video values are used. Hence, a low combined value may exceed the defect threshold. In contrast, where darkness values are used to create the combined value, a defect threshold may be 144 (device darkness value 12 times object darkness value 12). In this case, a high combined value may exceed a defect threshold.

If defect detection system 10 alone is used, logic proceeds to step S11, as described below. If maintenance detection is desired, logic proceeds as follows.

Maintenance Required Detection:

Referring to FIG. 2B, in steps S6-S11, maintenance determinator 29 determines when maintenance is required based on the defect determinator 34 outcome. More particularly, the determination can be based on whether an image is defective as defined by a defect count exceeding a defect count threshold. Alternatively, the maintenance determinator may determine when maintenance is required based on whether a consecutive defective image count exceeds an image count threshold.

A) Determining Whether an Object Image is Defective:

In step S6, a determination as to whether an object image is defective is made. The determination includes determining whether enough defects are present to warrant the image being considered defective.

In one embodiment, an object image is considered a defective image only when it contains a number of defects (>1) (which is maintained in a defect count) that exceeds a defect count threshold. Hence, the defect count threshold defines when an object image is a defective image. A defect count threshold may be set by a user to any number according to, for example, their tolerance for defects and/or the particular ICD 4 being used. The defect count is maintained and incremented by one by counter 32 (FIG. 1) for each defect. That is, for every particular location (i.e., an image video value and a corresponding device video value location) that creates a combined value exceeding the defect threshold, counter 32 increments the defect count for that image by one. Hence, for an image having X defects (where X is an integer), the defect count is X. Whether the defect count exceeds the defect count threshold may be determined, for example, by comparator 30 comparing the defect count for each image to the defect count threshold.

In another embodiment, only a single defect in an image may indicate a defective image. In this case, maintenance detection system 8 may simply make a determination that an image is defective when any combined value exceeds a defect threshold. In other words, maintenance detection system 8 may set the defect count threshold to one. In this case, the defect count simply fluctuates between zero and one.

If maintenance detection system 8 requires only a single defective image to indicate maintenance is required, steps S7-S9 are skipped, and a 'maintenance required' indication is given, at step S10, via an output mechanism of I/O 16, e.g., a display, a monitor, speaker, etc., of imaging system 2. Logic would then proceed to step S11, which is discussed below.

B) Determining Whether a Consecutive Defective Image Count Exceeds an Image Count Threshold:

Maintenance detection system 8 may also preferably determine when maintenance is required based on whether a number of defective images have been created by ICD 4, i.e., a consecutive defective image count exceeds an image count threshold. This setup requires a plurality of images to be created by ICD 4. The "consecutive defective image count," as the name implies, tracks how many consecutive defective images have been created.

Turning to step S7, if an image is determined not to be defective at step S6, a consecutive defective image count is reset to zero. The process then continues with step S11, which will be described below. In contrast, if the image is determined to be a defective image (step S6), at step S8, counter 32 (FIG. 1) increments the consecutive defective image count by one.

Next, at step S9, a determination is made by comparator 30 as to whether the consecutive defective image count exceeds an image count threshold. The "image count threshold" is a number that when exceeded indicates an ICD 4 has experienced enough consecutive defective images to indicate maintenance is required. If the consecutive defective image count exceeds the image count threshold, at step S10, a 'maintenance required' indication may be made via an output mechanism of I/O 16, e.g., a display, a monitor, speaker, etc., of imaging system 2. The image count threshold may be selected by the user, and may vary, for instance, according to the type of ICD 4 and the defect tolerance a user is willing to accept.

A user may select an image count threshold of one, which nulls the use of the consecutive defective image count and image count threshold. However, it is more preferable that the image count threshold exceeds one. The reason for this is that most objects 6 have some dark areas stretching the length of the object that could cause a false indication. However, using an image count threshold greater than one prevents a random object 6 having a darkened region (e.g., a document with a smudge) from causing a false 'maintenance required' indication. Assigning a higher value for the image count threshold also requires system 8 to experience a number of defective image(s) with a defect in the same location to have a false indication. Because objects are unlikely to have dark bands in the same location, a false indication is highly unlikely.

In addition, setting a higher image count threshold prevents premature false indications for problems that may self-correct. For instance, a piece of dust may cause a defect for an acceptable number of imaged objects. The piece of dust may then be removed through normal operation of the image capture device, e.g., removal by a subsequent imaged object, aerodynamic activity in an industrial scanner, etc. A user may set the image count threshold to five (5) and, hence, accept four defective images before an indication is made. Exemplary image count thresholds may be: 50-100 for an industrial scanner, or 5-10 passes for a desktop scanner.

Turning to step S11, each device video value that was used to create a combined value (referred to as a "used device video value") is updated by device video value profiler 24. In addition, the defect count is reset to zero.

As discussed above, step S11, could follow step S6, if only a single defective image is required to indicate maintenance is required, i.e., steps S7-S9 are not used. When a number of consecutive defective images are required (i.e., steps S7-S9 are used), step S11 is implemented when, at step S9, the consecutive defective image count does not exceed the image count threshold. Logic then returns to step S1 for another object imaging, or ends.

The updating of step S11 is such that the updated device video value reflects a measure of a corresponding image video value. More particularly, a device video value used to create a combined value is diminished (i.e., given a darker value) when the corresponding image video value is darker than the used device video value, and enlarged when the corresponding image video value is brighter than the used device video value. However, the step of updating each device video value occurs in a "sluggish" or "low pass filter" manner. That is, a device video value is not altered quickly or in large amounts.

However, each updated device video value is adjusted towards a brighter value more quickly than towards a darker value. This technique provides protection from a random object 6 having a dark defect, or a string of objects having dark defects, adversely effecting the device video values and hence the determination of defects. This further prevents false indications. This technique also allows systems 8, 10 to be able to distinguish between a defect resulting from hardware, namely the ICD components, and defects resulting from the object 6 being imaged because only those defects that repeat in a location effect the device video values. That is, defects that do not move from location to location are more likely on the hardware.

In order to accomplish this updating operation, in one embodiment, a difference between each image video value and a corresponding used device video value is determined. Then, the used device video value may be updated at a greater portion of the difference when the corresponding image video value is brighter than the used device video value versus when the corresponding image video value is darker than the used device video value.

In another embodiment, a used device video value may be updated by combining: a) a first percentage of the used device video value, and b) a second percentage of a corresponding image video value. In this case, the second percentage is greater when the corresponding image video value is brighter than the used device video value versus when the corresponding image video value is darker than the used device video value. For instance, where the used device video value is 235 and the image video value is 215 (darker), the first percentage may be 90% and the second percentage 10%. In contrast, where the used device video value is 235 and the image video value is 245 (brighter), the first percentage may be 50% and the second percentage 50%.

Although a couple of techniques have been described to weight the different video values, one with skill in the art will recognize that other approaches are possible. Accordingly, the invention should not be limited to the techniques described above but rather should include any now known or later developed weighting techniques. Furthermore, while processing has been described in which device video values have been updated after each object is imaged, it should be recognized that these values may be updated at other periods such as after passage of a time period.

It should also be recognized that while the device video profiler 24 has been described as the component that accesses and updates device video values, the profiler may be further compartmentalized. Furthermore, other system components may be arranged in other functional combinations. For instance, defect detection system 10 may be utilized separate from maintenance detection system 8.

The above described systems and methods provide a mechanism for detecting when maintenance is required for an ICD. Further, they provide a mechanism that is capable of distinguishing between defects of an ICD and an object.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for detecting when maintenance is required in an image capture device having a plurality of sensing elements for imaging an object, the method comprising the steps of:
   a) accessing a device video value for each sensing element;
   b) imaging an object with the image capture device;
   c) acquiring an image video value for each sensing element that experiences the object, each image video value representing a brightest video value experienced by the respective sensing element during imaging of the object;
   d) combining each image video value with a corresponding device video value to create a combined value for each image video value;
   e) determining a defect is present in the image capture device for each combined value that exceeds a defect threshold;
   f) determining when maintenance is required based on the presence of at least one defect; and
   g) indicating when maintenance is required for the image capture device.

2. The method of claim 1, wherein the step of determining when maintenance is required includes determining whether the image is defective as defined by a defect count exceeding a defect count threshold.

3. The method of claim 2, wherein the defect count threshold exceeds one.

4. The method of claim 1, wherein the step of determining when maintenance is required includes repeating steps a) through e) for a plurality of objects and:
   for each object, determining whether the image is defective as defined by a defect count exceeding a defect count threshold; and
   determining maintenance is required when a consecutive defective image count exceeds a consecutive defective image count threshold.

5. The method of claim 4, wherein the consecutive defective image count threshold exceeds one.

6. The method of claim 4, wherein the defect count threshold exceeds one.

* * * * *